(No Model.)

J. T. WHILDEN.
STALK PULLER.

No. 389,348. Patented Sept. 11, 1888.

WITNESSES:
J. C. Clark.
C. Sedgwick.

INVENTOR:
J. T. Whilden
BY Munn & Co.
ATTORNEYS.

UNITED STATES PATENT OFFICE.

JOHN T. WHILDEN, OF STOCKTON, GEORGIA.

STALK-PULLER.

SPECIFICATION forming part of Letters Patent No. 389,348, dated September 11, 1888.

Application filed January 19, 1888. Serial No. 261,225. (No model.)

*To all whom it may concern:*

Be it known that I, JOHN THOMAS WHILDEN, of Stockton, in the county of Clinch and State of Georgia, have invented a new and Improved Stalk-Puller, of which the following is a full, clear, and exact description.

This invention relates to a simple, cheap, and durable implement that is adapted for use in the pulling of stalks, the parts being so arranged that the mechanism acting directly upon the stalks may be raised from the ground at times when it is desired to move the machine from place to place, or when obstacles appear in the path of the machine.

Reference is to be had to the accompanying drawings, forming a part of this specification, in which similar figures of reference indicate corresponding parts in all the views.

Figure 1:
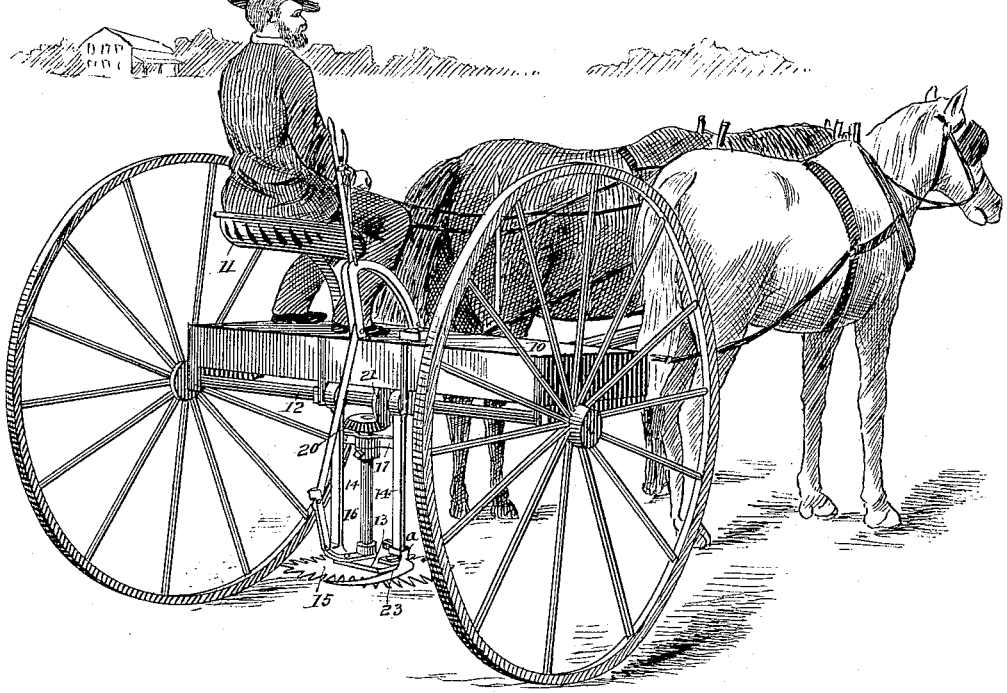
Figure 2:
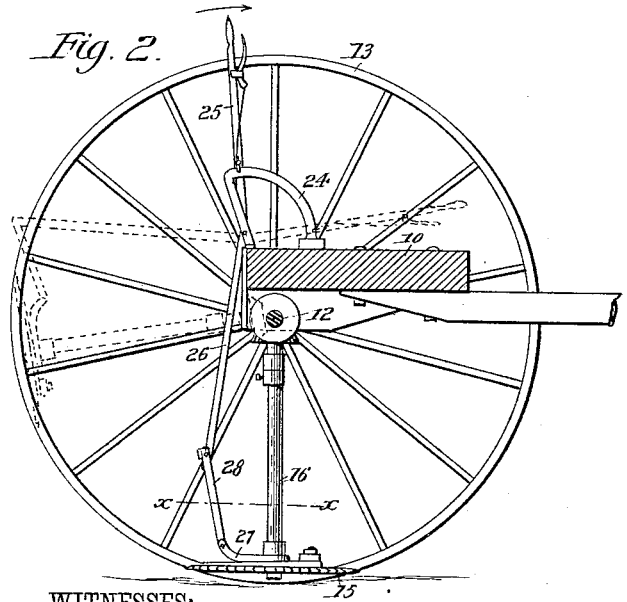
Figure 3:
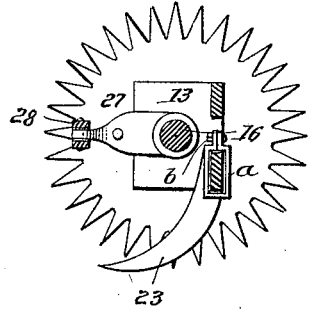

Figure 1 is a perspective view of my improved form of machine. Fig. 2 is a longitudinal sectional view of a portion of the same, and Fig. 3 is a view taken on line $x$ $x$ of Fig. 2.

In the drawings above referred to, 10 represents the body of the stalk-puller, upon which there is mounted a driver's seat, 11. This body 10 carries an axle, 12, which carries a loose-running and a rigidly-connected wheel. A platform, 13, is suspended from the axle 12 by arms 14, the upper ends of which are apertured, so as to provide for the loose passage of the axle.

Beneath the platform 13, I mount a toothed wheel, 15, which is rigidly connected to the lower end of a shaft, 16, said shaft being supported and guided near its upper end by a bracket, 17. The teeth of the wheel 15 are V-shaped, so that the stalks will pass in the space between the teeth and be wedged therein, so that as the wheel revolves they will be pulled up by their roots. Upon the upper end of the shaft 16 there is mounted a bevel-gear, 20, that is engaged by a corresponding gear, 21, carried by the axle 12, the arrangement being such that as the axle is revolved a rotary motion will be imparted to the shaft 16, and consequently to the wheel 15. A curved-faced clearer, 23, is arranged as best shown in Fig. 3, this clearer being adjustably connected to one of the hangers 14 by means of a sleeve, $a$, and clamping-bolt $b$.

Such being the general construction of the stalk-puller, it will be understood that as the machine advances and the axle 12 revolves a rotary movement will be imparted to the toothed wheel 15, so that as it comes in contact with the stalks they will be wedged in between the teeth and pulled up by their roots, the stalks being held by the wheel until they are forced out from between the teeth of the wheel by coming in contact with the clearer 23 during the revolution of the said wheel, when they will fall to the ground.

In order to avoid the necessity of always having the wheel 15 in close proximity to the ground, I mount a segmental rack, 24, upon the body 10, and in connection with this rack I arrange a lever, 25, which has a downwardly-extending arm, 26, said arm being connected to a bracket, 27, carried by the platform 13 by means of a link, 28, the construction being such that when the lever 25 is thrown in the direction of its arrow the platform 13 and the parts arranged in connection therewith will be moved to the position indicated by dotted lines in Fig. 2.

Having thus fully described my invention, I claim as new and desire to secure by Letters Patent—

1. In a stalk-puller, the combination, with an axle and a platform suspended therefrom, of a vertical shaft supported by the platform, a wheel on the lower end of the shaft and provided with V-shaped teeth, between which the stalks are adapted to pass and be held, a clearer held above the wheel, and means for rotating the said wheel-shaft from the axle, substantially as herein shown and described.

2. In a stalk-puller, the combination, with an axle provided with a gear-wheel, and a platform suspended from the axle, of a vertical shaft supported by the platform and provided with a gear-wheel meshing with the gear-wheel of the axle, a wheel secured to the lower end of the shaft and provided with V-shaped teeth, and a curved clearer secured to one of the hangers of the platform above the wheel, substantially as herein shown and described.

3. In a stalk-puller, the combination, with the supporting-frame and the axle 12, provided with the gear-wheel 21, of a platform, 13, loosely suspended from the axle, a shaft, 16, supported by the platform and provided with the gear-wheel 20, a toothed wheel, 15, secured to the shaft, the clearer supported above the wheel, a lever, 25, pivoted to the frame, and a link pivoted to the lever and platform, substantially as herein shown and described.

JOHN T. WHILDEN.

Witnesses:
R. A. HARVEY,
V. P. HARVEY.